(12) United States Patent
Ting et al.

(10) Patent No.: US 10,459,494 B2
(45) Date of Patent: Oct. 29, 2019

(54) PORTABLE ELECTRONIC DEVICE

(71) Applicants: INVENTEC (PUDONG) TECHNOLOGY CORPORATION, Shanghai (CN); INVENTEC CORPORATION, Taipei (TW)

(72) Inventors: Ssu Han Ting, Taipei (TW); Chih-Cheng Li, Taipei (TW)

(73) Assignees: Inventec (Pudong) Technology Corporation, Shanghai (CN); Inventec Corporation, Taipei (TW)

( * ) Notice: Subject to any disclaimer, the term of this patent is extended or adjusted under 35 U.S.C. 154(b) by 0 days.

(21) Appl. No.: 16/176,968

(22) Filed: Oct. 31, 2018

(65) Prior Publication Data
US 2019/0294216 A1 Sep. 26, 2019

(30) Foreign Application Priority Data
Mar. 23, 2018 (CN) .......................... 2018 1 0246302

(51) Int. Cl.
*G06F 1/16* (2006.01)
*H01Q 1/22* (2006.01)
(52) U.S. Cl.
CPC .......... *G06F 1/1683* (2013.01); *G06F 1/1681* (2013.01); *H01Q 1/2266* (2013.01); *H01Q 1/2291* (2013.01)

(58) Field of Classification Search
CPC ... G06F 1/1683; G06F 1/1681; H01Q 1/2291; H01Q 1/2266
USPC ....................................................... 455/90.3
See application file for complete search history.

(56) References Cited

U.S. PATENT DOCUMENTS

2015/0153773 A1* 6/2015 Chang ................... G06F 1/1616
455/557
2015/0270619 A1* 9/2015 Zhu ........................ G01V 3/00
343/702

* cited by examiner

*Primary Examiner* — Ayodeji O Ayotunde
(74) *Attorney, Agent, or Firm* — Huffman Law Group, P.C.

(57) ABSTRACT

A portable electronic device comprises a main body and an antenna. The main body comprises a first casing, a second casing and a hinge, with the hinge connecting the first casing and the second casing so as to allow the first casing to be flipped relatively to the second casing. The antenna comprises a radiation structure and an excitation circuit. The radiation structure comprises a first metal layer and a second metal layer, with the first metal layer disposed at the first casing, the second metal layer disposed at the second casing, and a slot formed between the first metal layer and the second metal layer. The excitation circuit is disposed in the first casing, and comprising an electromagnetic wave emitting portion configured to emit an electromagnetic wave towards the slot.

15 Claims, 7 Drawing Sheets

PORTABLE ELECTRONIC DEVICE

CROSS-REFERENCE TO RELATED APPLICATIONS

This non-provisional application claims priority under 35 U.S.C. § 119(a) on Patent Application No(s). 201810246302.5 filed in China on Mar. 23, 2018, the entire contents of which are hereby incorporated by reference.

BACKGROUND

Technical Field

This disclosure relates to a portable electronic device, and particularly to a portable electronic device with an antenna.

Related Art

Nowadays, Internet technologies are booming and the Internet applications have become inseparable from modern life. For example, people can learn about news and information, contact with friends and family, record their life, etc. In response to the demand of personal portable electronic devices, the way to access the Internet has developed from Internet access to wireless Internet access. Almost all portable electronic devices, such as laptops, personal digital assistants, smart phones and even digital cameras, are equipped with wireless Internet access.

The antenna is a key component for wireless communication. Currently, the antenna design embedded in a portable electronic device, such as a metal stamping antenna or a printed circuit board antenna, requires a metal processing mold for manufacture. Since making the mold is not only expensive but time consuming, it is difficult to control the cost and the schedule of the development of new products. Moreover, when the embedded antenna outputs an electromagnetic wave from the inside of a portable electronic device, the radiation field of the antenna must be interfered or blocked by the metal components surrounding it. In order to prevent the signal shielding caused by covering the antenna with a metal shell, for the conventional antenna, a slot is formed in a conspicuous part of the electronic device corresponding to the location of the antenna. Although the non-metallic material is used to cover the slot, said conspicuous part cannot have a flat all-metal surface, and the overall appearance of the electronic device is thus affected.

SUMMARY

This disclosure provides a portable electronic device.

According to one or more embodiment of this disclosure, a portable electronic device comprises a main body and an antenna. The main body comprises a first casing, a second casing and a hinge, with the hinge connecting the first casing and the second casing so as to allow the first casing to be flipped relatively to the second casing. The antenna comprises a radiation structure and an excitation circuit. The radiation structure comprises a first metal layer and a second metal layer, with the first metal layer disposed at the first casing, the second metal layer disposed at the second casing, and a slot formed between the first metal layer and the second metal layer. The excitation circuit is disposed in the first casing, and comprising an electromagnetic wave emitting portion configured to emit an electromagnetic wave towards the slot.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1A:
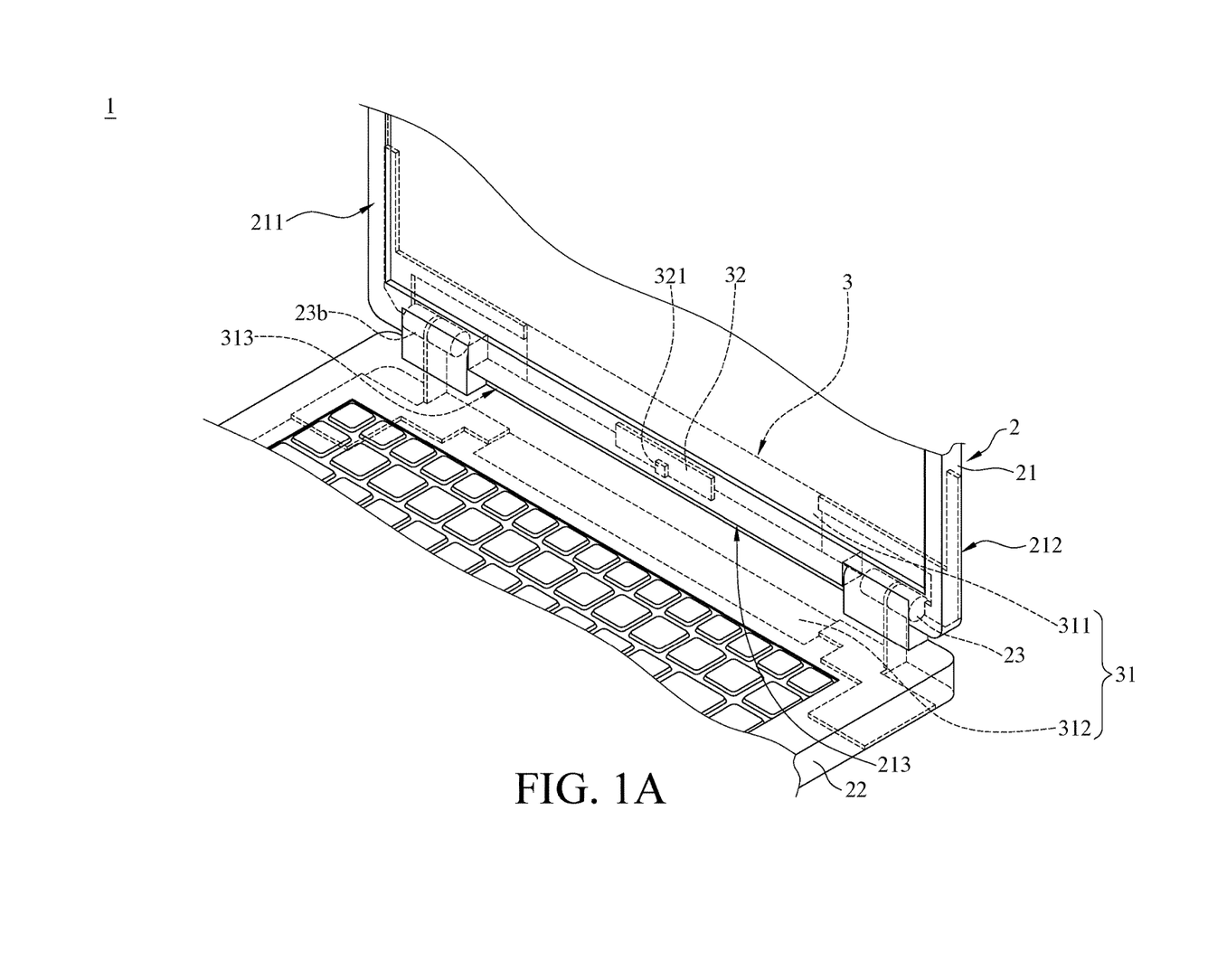
FIG. 1A is a partial view of a portable electronic device according to an embodiment of this disclosure.

Please refer to FIG. 1A which is a partial view of a portable electronic device according to an embodiment of this disclosure. The portable electronic device 1, such as a laptop, a convertible tablet, an electronic dictionary or other electronic device with a clamshell structure, comprises a main body 2 and an antenna 3. The main body 2 comprises a first casing 21, a second casing 22 and at least one hinge 23, wherein the hinge 23 connects the first casing 21 and the second casing 22 so as to allow the first casing 21 to be flipped relatively to the second casing 22. In the embodiment as shown in FIG. 1A, a laptop is exemplified to serve as the portable electronic device 1. In addition to the first casing 21, the second casing 22 and two hinges 23 and 23b, the main body 2 also comprises the components that a typical laptop has, such as a central processing unit, memory, etc. The details of these components belong to common knowledge in the art so they are not described herein.

The antenna 3 of the portable electronic device 1 comprises a radiation structure 31 and an excitation circuit 32. The radiation structure 31 comprises a first metal layer 311 and a second metal layer 312, wherein the first metal layer 311 is disposed at the first casing 21 of the main body 2, and the second metal layer 312 is disposed at the second casing 22. A slot 313 is formed between the first metal layer 311 and the second metal layer 312. In an embodiment, the first metal layer 311 and the second metal layer 312 are respectively grounded so that a dual open-end slot 313 is formed therebetween.

In another embodiment, the first metal layer 311 and the second metal layer 312 have an electrically conductive connection therebetween via the hinge 23, and the slot 313 is defined by the first metal layer 311, the second metal layer 312 and the hinge 23. More specifically, a metal layer is disposed in the hinge 23 for serving as an electrically conductive connector between the first metal layer 311 and the second metal layer 312, or the hinge 23 can be made of metallic material for serving as the electrically conductive connector between the first metal layer 311 and the second metal layer 312. The first metal layer 311, the second metal layer 312 and the hinge 23 are grounded together so as to form a single open-end slot 313 therebetween. It should be particular noted that FIG. 1A exemplarily illustrates that the slot 313 extends from the hinge 23 to the center of the portable electronic device 1, but in another embodiment, the slot 313 can also extend from the hinge 23 to the outside of the portable electronic device 1.

In yet another embodiment, both of the two hinge 23 and 23b are portable electronic device 1 comprises metal layers disposed therein or are made of metallic material. Moreover, both of them serve as the electrically conductive connectors between the first metal layer 311 and the second metal layer 312. The first metal layer 311, the second metal layer 312 and the two hinges 23 and 23b are grounded together so as to form a closed slot 313 therebetween. In other words, the slot 313 is located between the two hinges 23 and 23b. As for the locations of the first metal layer 311 and the second metal layer 312 respectively in the first casing 21 and the second casing 22, the related details are described later.

The excitation circuit 32 of the antenna 3 is disposed in the first casing 21 and comprises an electromagnetic wave emitting portion 321 configured to emit an electromagnetic wave towards the slot 313. For example, the electromagnetic wave emitting portion 321 is implemented by a metal pattern and the design style of the metal pattern is not limited in this disclosure. Moreover, the detailed structure of the excitation circuit 32 is described later. It should be particularly noted that FIG. 1A exemplarily illustrates that the upper lid of a laptop serves as the first casing 21, and the bottom base of the laptop serves as the second casing 22. However, in another embodiment, the bottom base of the laptop can be defined to be the first casing 21, and the upper lid can be defined to be the second casing 22. In other words, the excitation circuit 32 of the antenna 3 can be disposed in any one casing of the portable electronic device 1, and this disclosure does not intend to limit it.

Figure 1B:
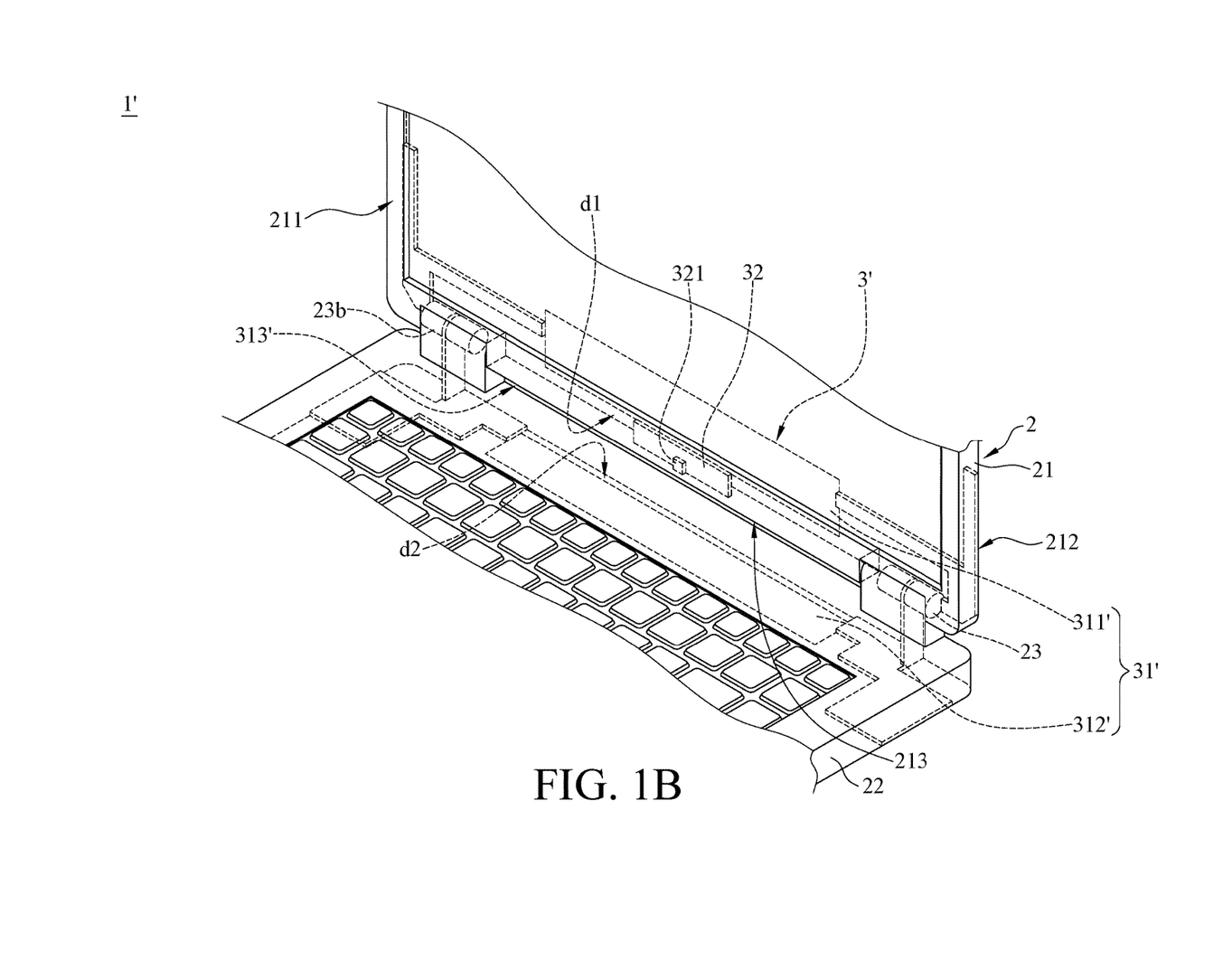
FIG. 1B is a partial view of a portable electronic device according to another embodiment of this disclosure.

Please refer to FIGS. 1A and 1B, wherein FIG. 1B is a partial view of a portable electronic device 1' according to another embodiment of this disclosure. The portable electronic device 1' shown in FIG. 1B, similar to the portable electronic device 1 shown in FIG. 1A, is exemplified to be a laptop. The main body 2 of the portable electronic device 1' similarly comprises a first casing 21, a second casing 22 and two hinges 23 and 23b, and its antenna 3' also comprises a radiation structure 31' and an excitation circuit 32, wherein the relative disposition between the radiation structure 31' and the excitation circuit 32, and the relative disposition between the excitation circuit 32 and the main body 2 are similar to those in the aforementioned embodiment, so they are not repeated herein.

More particularly, the disposition of the first metal layer 311 in the first casing 21 and the disposition of the second metal layer 312 in the second casing 22 shown in FIG. 1A, and the disposition of the first metal layer 311' in the first casing 21 and the disposition of the second metal layer 312' in the second casing 22 shown in FIG. 1B are described in the following. The first casing 21 comprises a front-facing surface 211, an outer surface 212 and a edge surface 213, wherein the front-facing surface 211 is opposite to the outer surface 212, and the edge surface 213 connects the front-facing surface 211 and the outer surface 212. More specifically, the front-facing surface 211 can be the surface where a screen is disposed of the upper lid of the laptop, and cover the bottom base when the opened angle between the upper lid and the bottom base is 0 degree; the outer surface 212 can be the outer surface of the upper lid; and the edge surface 213 can be the surface adjacent to the bottom base when the opened angle between the upper lid and the bottom base of the laptop is 180 degrees. Moreover, the second casing 22 can also comprise a front-facing surface, a edge surface and an outer surface, and the relative locations among these three surfaces are similar to those in the first casing 21, so they are not repeated.

In the embodiment shown in FIG. 1A, there is a gap between the first casing 21 and the second casing 22. The first metal layer 311 is disposed on the outer surface 212 of the first casing 21, and its edge is aligned to the edge, near the second casing 22, of the outer surface 212 of the first casing 21. The second metal layer 312 is also disposed on the outer surface of the second casing 22, and its edge is aligned to the edge, near the first casing 21, of the outer surface of the second casing 22. In a practical example of the above disposition, the first casing 21 and the second casing 22 are implemented by full metal shells, and the first metal layer 311 and the second metal layer 312 are respectively the outer surfaces of the first casing 21 and the second casing 22; in another practical example, the first metal layer 311 and the second metal layer 312 can be respectively disposed on the outer surfaces of the first casing 21 and the second casing 22 made of non-metallic material. By the above disposition, the gap between the first casing 21 and the second casing 22 serves as the slot 313 for the antenna 3. By using the above gap as the slot 313, the fabrication process of the slot may be removed, so that the entire fabrication process of antenna 3 may be simplified. Moreover, because there is possibly no need to dispose the slot 313 on the outer surface 212 of the casing 21, the portable electronic device 1 may be designed to have all-metal outer surface 212 and its external appearance may be improved.

In another embodiment, as shown in FIG. 1B, there is a gap d1 between the edge of the first metal layer 311' and the edge, near the second casing 22, of the outer surface 212 of the first casing 21, and there is a gap d2 between the edge of the second metal layer 312' and the edge, near the first casing 21, of the outer surface of the second casing 22. In yet another embodiment, merely the edge of one of the first metal layer 311' and the second metal layer 312' has a gap from the edge of the casing. In FIG. 1B, the slot 313' is formed between the edge of the first metal layer 311' and the edge of the second metal layer 312'.

In each of the above two embodiments, the excitation circuit 32 is disposed in the first casing 21, and comprises the electromagnetic wave emitting portion 321 which emits an electromagnetic wave having a frequency from the edge surface 213 towards the slot 313/313' so as to excite the slot 313 to generate a second electromagnetic wave having another frequency. In another embodiment, the electromagnetic wave emitting portion 321 can emit an electromagnetic wave from the edge surface 213 of the first casing 21 towards the slot and from the front-facing surface 211 towards the outside (i.e. outwards from the front-facing surface 211) simultaneously. In other words, the electromagnetic wave emission range of the electromagnetic wave emitting portion 321 can cover the edge surface 213 and the front-facing surface 211 of the first casing 21. Therefore, the antenna 3/3' can generate two kinds of electromagnetic waves having different frequencies. For example, the electromagnetic wave emitting portion 321 of the excitation circuit 32 can generate an electromagnetic wave having a frequency of 5 GHz, and excite the slot 313/313' to generate a second electromagnetic wave having a frequency between 2.4 GHz and 2.5 GHz. More specifically, the width of the slot 313/313' can be designed to be between 1 millimeter (mm) and 5 mm for a better performance of electromagnetic wave excitation.

Moreover, it should be particularly noted that the location of the excitation circuit 32 in the first casing 21 and the location of the electromagnetic wave emitting portion 321 in the excitation circuit 32 in each of FIGS. 1A and 1B are exemplarily illustrated. In another embodiment, the electromagnetic wave emitting portion is disposed around the slot, and the other components of the excitation circuit can be disposed anywhere in the casing and is not limited to be disposed around the slot.

Figure 2A:
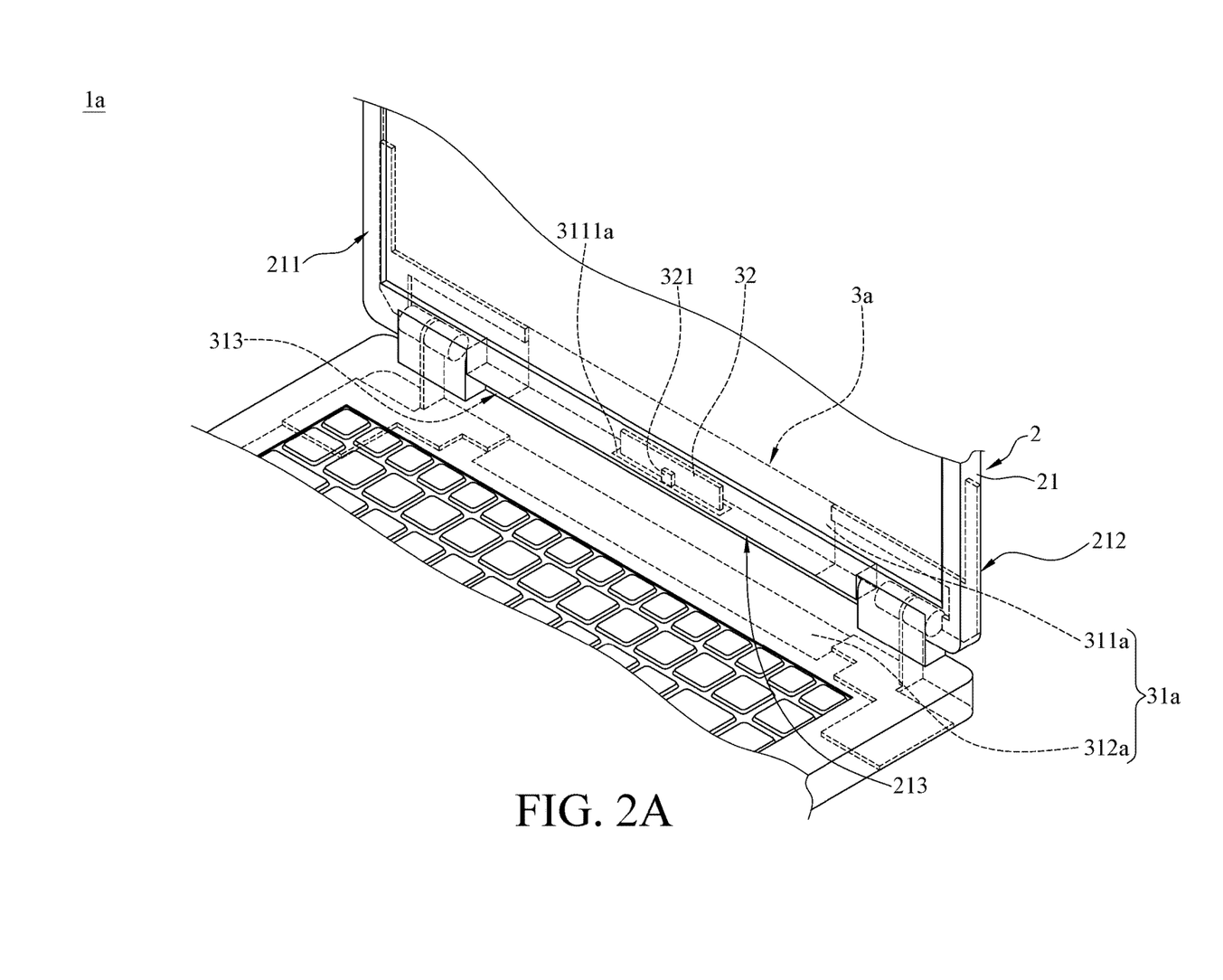
FIG. 2A is a partial view of a portable electronic device according to yet another embodiment of this disclosure.
Figure 2B:
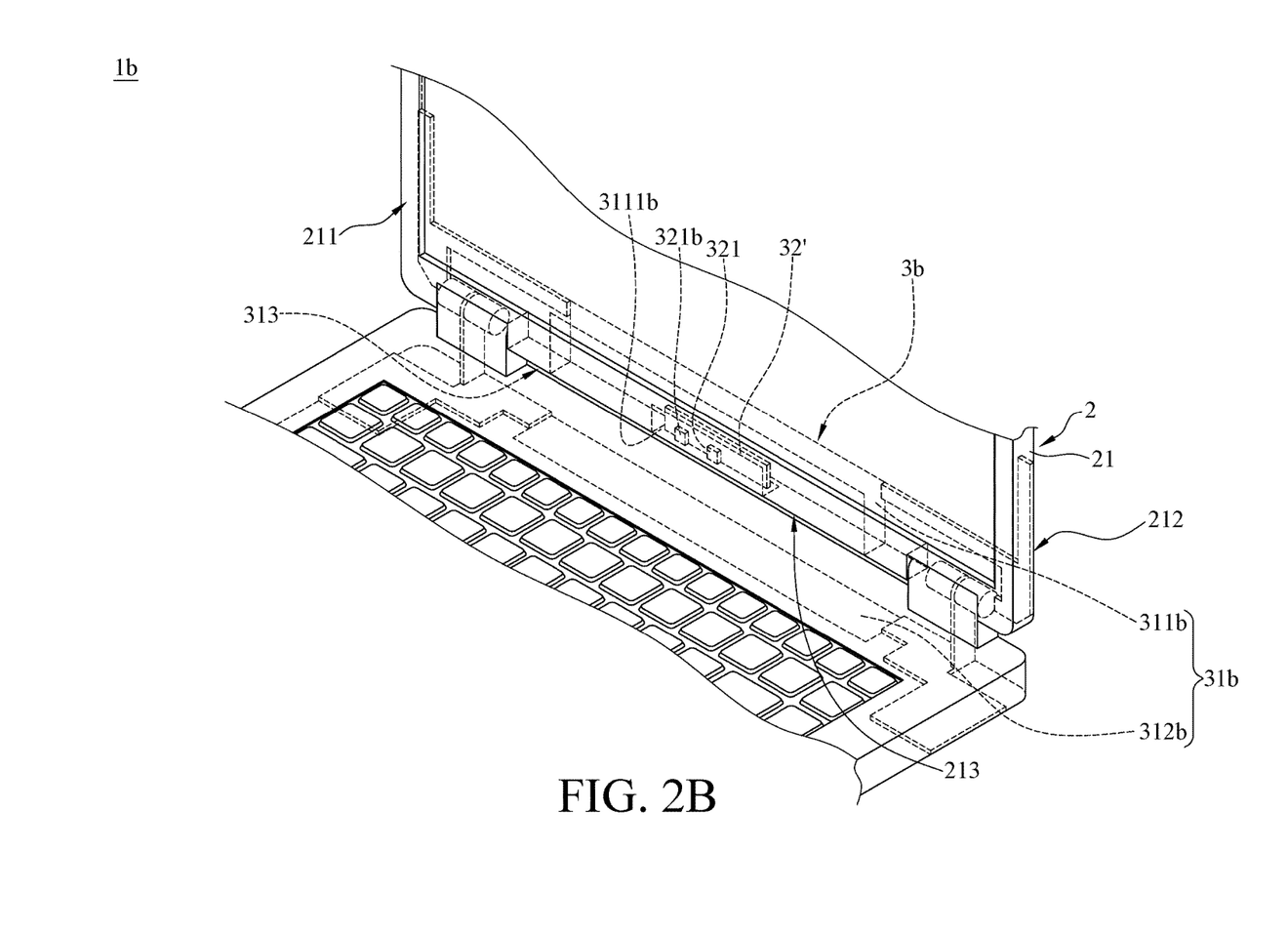
FIG. 2B is a partial view of a portable electronic device according to yet another embodiment of this disclosure.
Figure 2C:
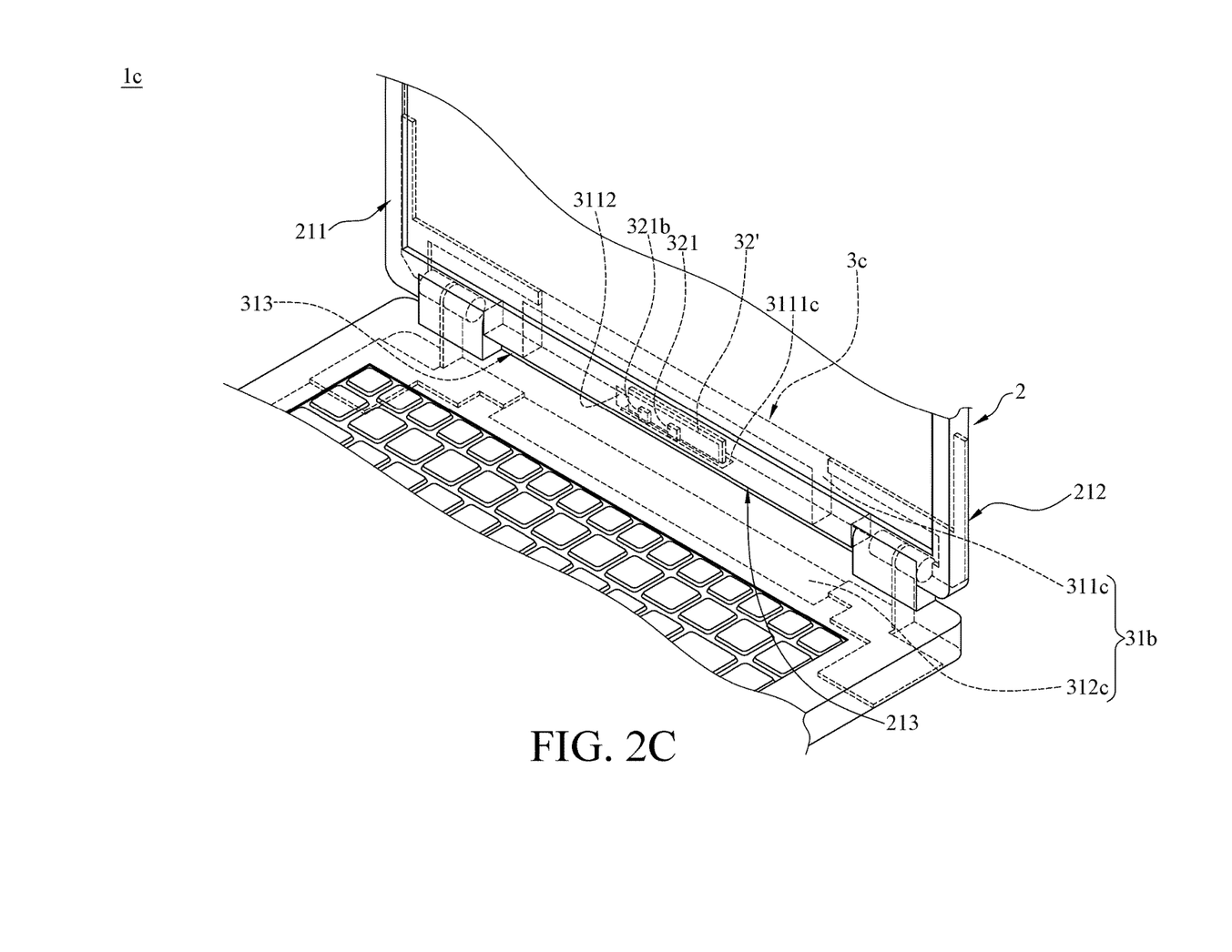
FIG. 2C is a partial view of a portable electronic device according to yet another embodiment of this disclosure.
Figure 2D:
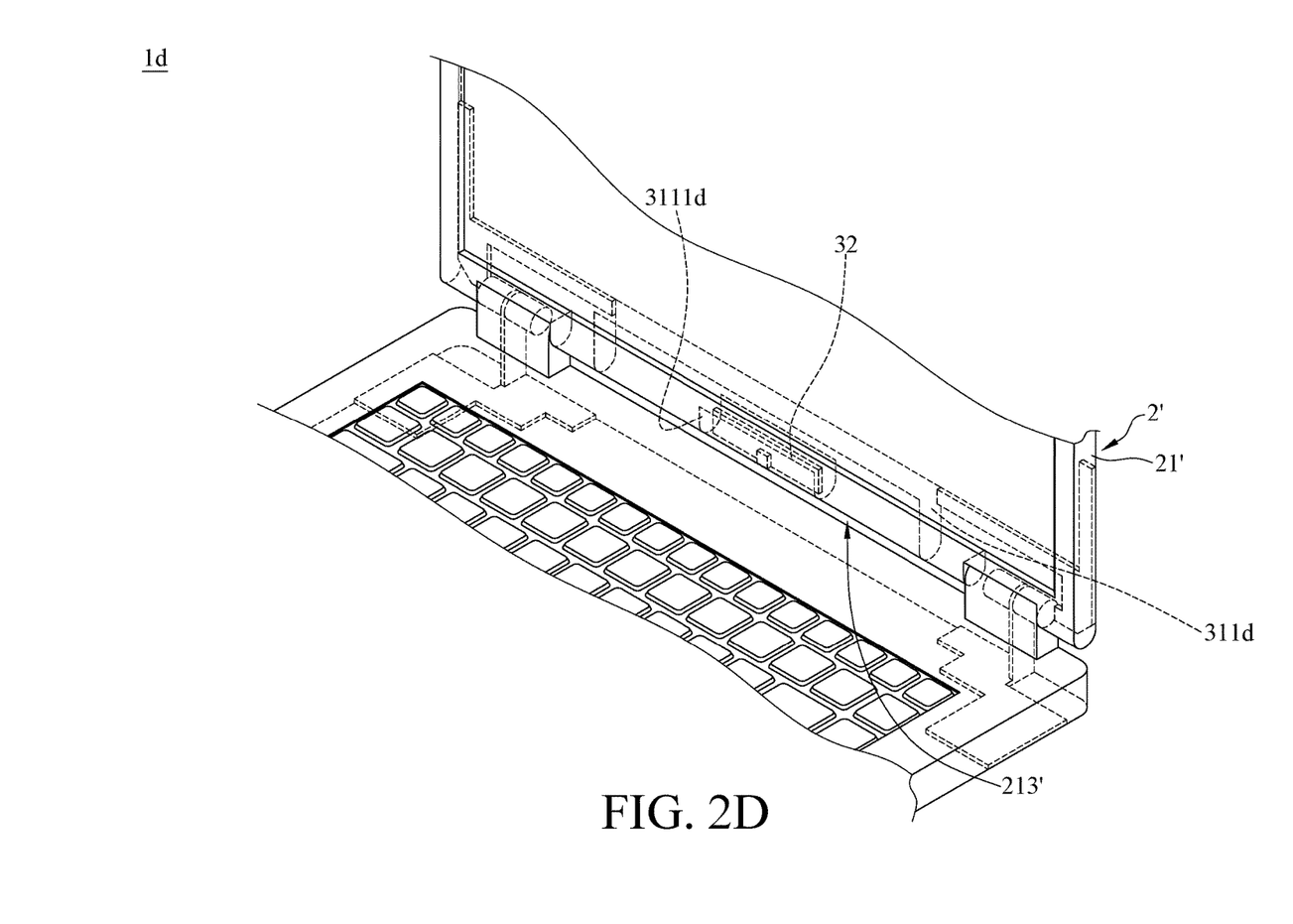
FIG. 2D is a partial view of a portable electronic device according to yet another embodiment of this disclosure.

In addition, in the above embodiments, the first metal layer 311/311' is disposed on the outer surface 212 of the first casing 21. However, in another embodiment, the first metal layer can extend to other one or more surfaces of the first casing 21. Please refer to FIGS. 2A-2D, wherein FIG. 2A is a partial view of a portable electronic device 1a according to yet another embodiment of this disclosure; FIG. 2B is a partial view of a portable electronic device 1b according to yet another embodiment of this disclosure; FIG. 2C is a partial view of a portable electronic device 1c according to yet another embodiment of this disclosure; and FIG. 2D is a partial view of a portable electronic device 1d according to yet another embodiment of this disclosure.

In the embodiments as shown in FIGS. 2A-2D, the portable electronic devices 1a-1d, similar to the portable electronic devices 1 and 1' shown in FIGS. 1A and 1B, are exemplified to be laptops, and the relative dispositions among their components are approximately similar to those in the aforementioned embodiments, so the similarities are not repeated and the differences among the embodiments are described in the following.

In the embodiment shown in FIG. 2A, the first metal layer 311a of the radiation structure 31a of the antenna 3a is disposed on the outer surface 212 and the edge surface 213 of the first casing 21, and the partial first metal layer 311a on the outer surface 212 and the partial first metal layer 311a on the edge surface 213 have a electrically conductive connection therebetween. The first metal layer 311a has an opening 3111a in the edge surface 213 to expose the electromagnetic wave emitting portion 321 of the excitation circuit 32. For example, the region on the first casing 21 corresponding to the opening 3111a of the first metal layer 311a is made of non-metallic material. Through the opening 3111a of the first metal layer 311a, the electromagnetic wave emitting portion 321 of the excitation circuit 32 can emit an electromagnetic wave from the edge surface 213 to the slot 313, so that the electromagnetic wave may not be blocked by the first metal layer 311a.

In the embodiment shown in FIG. 2B/2C, the first metal layer 311b/311c of the radiation structure 31b/31c of the antenna 3b/3c is further disposed on the front-facing surface 211 of the first casing 21 besides the outer surface 212 and the edge surface 213 of the first casing 21. The partial first metal layer 311b/311c on the outer surface 212, the partial first metal layer 311b/311c on the edge surface 213, and the partial first metal layer 311b/311c on the front-facing surface 211 have an electrically conductive connection therebetween. Similar to the radiation structure 31a shown in FIG. 2A, the first metal layer 311b/311c of the radiation structure 31b/31c shown in FIG. 2B/2C has an opening 3111b/3111c in the edge surface 213 to expose the electromagnetic wave emitting portion 321 of the excitation circuit 32'.

As aforementioned, besides emitting an electromagnetic wave from the edge surface 213 of the first casing 21 towards the slot 313, the electromagnetic wave emitting portion 321 can also emit the electromagnetic wave from the front-facing surface 211 towards the outside of the first casing 21. Accordingly, an opening is formed in the partial first metal layer 311b/311c on the front-facing surface 211 of the first casing 21 so as to provide a channel for the electromagnetic wave emitting portion 321 to emit the electromagnetic wave. For example, in the embodiment shown in FIG. 2B, the opening 3111b of the first metal layer 311b extends from the edge surface 213 to the front-facing surface 211 of the first casing 21; in contrast, in the embodiment shown in FIG. 2C, the first metal layer 311c has openings 3111c and 3112 respectively in the edge surface 213 and the front-facing surface 211 of the first casing 21.

Moreover, as shown in FIGS. 2B and 2C, the excitation circuit 32' can further comprise a second electromagnetic wave emitting portion 321b configured to emit another electromagnetic wave from the front-facing surface 211 of the first casing 21 towards the outside of the first casing 21 (i.e. outwards from the front-facing surface 211). More particularly, the second electromagnetic wave emitting portion 321b can emit an electromagnetic wave through the opening 3111b in FIG. 2B or the opening 3112 in FIG. 2C out of the first casing 21 in a direction perpendicular to the front-facing surface 211. In this embodiment, the electromagnetic wave emitted by the second electromagnetic wave emitting portion 321b and that emitted by the electromagnetic wave emitting portion 321 have different frequencies. For example, the electromagnetic wave emitting portion 321 can generate an electromagnetic wave having a frequency of 5 GHz, and the second electromagnetic wave emitting portion 321b can generate an electromagnetic wave having a frequency between 2.4 GHz and 2.5 GHz. As another example, the electromagnetic wave emitting portion 321 can generate an electromagnetic wave having a frequency of 2 GHz or 5 GHz, and the slot can response to this electromagnetic wave to generate another electromagnetic wave having another new frequency.

In the embodiment shown in FIG. 2D, the edge surface 213' of the first casing 21' belongs to a cambered surface. As mentioned in the above embodiments, when the distribution area of the first metal layer 311d at the first casing 21' must block the electromagnetic wave emitted by the electromagnetic wave emitting portion 321 of the excitation circuit 32, an opening 3111d is formed in the first metal layer 311d for the electromagnetic wave to be transmitted from the inside of the first casing 21' to the outside thereof. In FIG. 2D, the location and the size of the opening 3111d are exemplarily illustrated, and are not limited in this disclosure.

It should be particularly noted that FIGS. 1A, 1B and 2A-2D exemplarily illustrate that the first metal layer and the second metal layer are respectively disposed in the partial regions of the outer surfaces of the first casing and the second casing. However, the area and the location of the first metal layer or the second metal layer can be designed based on the actual process requirements. In an embodiment, the first metal layer and the second metal layer can be respectively cover the whole of the first casing and the second casing (e.g. respectively being the metal outer layer of the upper lid and that of the bottom base of a laptop or other portable electronic device). Moreover, the first metal layer can be disposed between the outer surface and the front-facing surface of the upper lid, or/and the second metal layer can be disposed between the outer surface and the front-facing surface of the bottom base. By this kind of disposition, the first and second metal layers may not be damaged by the external environment, and the outer surface of the electronic device may be designed to be made of the material other than metal.

Another thing should be particularly noted is that the above FIGS. 1A, 1B and 2A-2D exemplarily illustrate that the first casing is implemented by the upper lid of a laptop, and the second casing is implemented by the bottom base of the lap top. However, in another embodiment, the bottom base of the laptop can be defined to be the first casing, and the upper lid can be defined to be the second casing. In other words, the excitation circuit 32 of the antenna 3 can be disposed in any one casing of the portable electronic device 1, and this disclosure does not intend to limit it.

Figure 3:
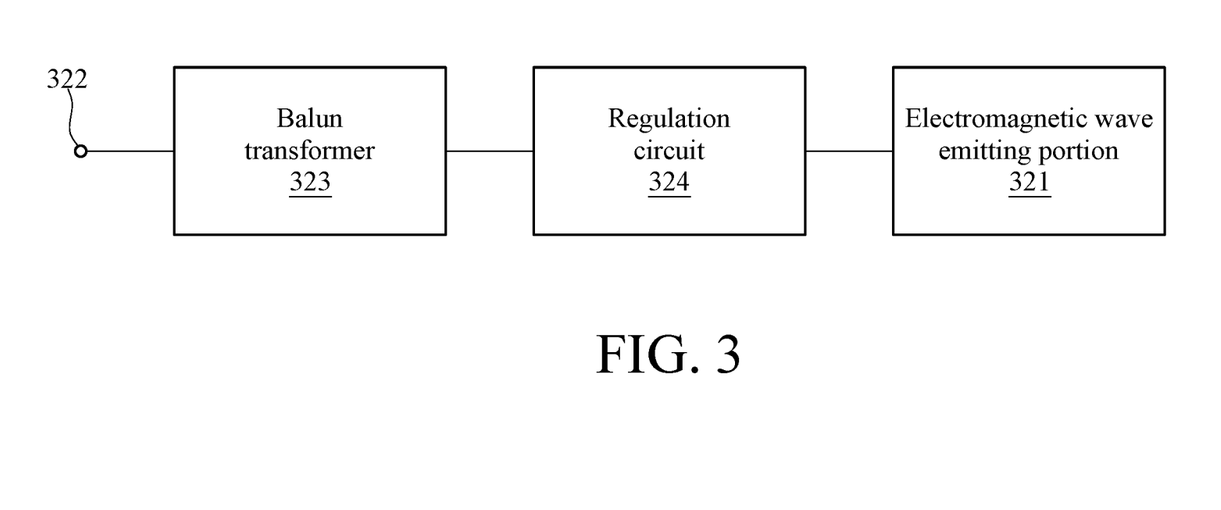
FIG. 3 is a function block diagram of an excitation circuit of a portable electronic device according to an embodiment of this disclosure.

Please refer to FIG. 3 for the detailed circuit structure of the excitation circuit 32 in the above embodiments. FIG. 3 is a function block diagram of the excitation circuit 32 of a portable electronic device according to an embodiment of this disclosure. As shown in FIG. 3, the excitation circuit 32 comprises the electromagnetic wave emitting portion 321 as aforementioned. Besides, the excitation circuit 32 further comprises a signal input port 322, a balun transformer 323 and a regulation circuit 324, wherein the signal input port 322, the balun transformer 323, the regulation circuit 324 and the electromagnetic wave emitting portion 321 are sequentially electrically connected with one another.

The signal input port 322 is configured to be electrically connected with a coaxial cable. The coaxial cable comprises at least a conducting wire, an insulation layer coating the conducting wire, and a conductive layer outside the insulation layer. The balun transformer 323, such as a balanced-to-unbalanced transformer, receives a feed signal from the conducting sire of the coaxial cable via the signal input port 322, and receives a ground signal from the conductive layer via the signal input port 322, so as to generate a balanced signal and transmit it to the regulation circuit 324. The regulation circuit 324 comprises a impedance matching circuit for example, with the impedance matching circuit configured to adjust the received signal so as to match the characteristic impedance of the signal end with the impedance of the load end of the excitation circuit 32. In other words, the impedance matching circuit of the excitation circuit 32 can match the characteristic impedance of the side connected with the balun transformer 323 with the load impedance of the side connected with the electromagnetic wave emitting portion 321. For example, the impedance matching circuit is implemented by a π-shaped, a T-shaped or L-shaped circuit. The regulation circuit 324 feeds the adjusted signal into the electromagnetic wave emitting portion 321. For example, the electromagnetic wave emitting portion 321 is implemented by a metal pattern, generates an electromagnetic wave according to the signal from the regulation circuit 324 and emits said electromagnetic wave. The design style of the metal pattern is not limited in this disclosure.

In view of the above description, in the portable electronic device provided in this disclosure, the metal layers of the antenna are respectively disposed in the edge regions of the two casings near the hinge of the portable electronic device, and the gap between the two casings or among the two casings and the hinge is used to be the slot of the antenna. In the fabrication process of the antenna of the portable electronic device, there is possibly no need to execute etching process of a slot on the metal layer, and also possibly no need to design an antenna pattern with a slot and to execute printing process. Therefore, the fabrication process of the slot may be removed, and the entire fabrication process may be simplified. Moreover, because there is possibly no need to dispose a slot on the casing, the casing of the portable electronic device may be designed to have all-metal outer surface and its external appearance may be improved.

What is claimed is:
1. A portable electronic device, comprising:
a main body comprising a first casing, a second casing and a hinge, with the hinge connecting the first casing and the second casing so as to allow the first casing to be flipped relatively to the second casing; and
an antenna comprising:
a radiation structure comprising a first metal layer and a second metal layer, with the first metal layer disposed at the first casing, the second metal layer disposed at the second casing, and a slot formed between the first metal layer and the second metal layer; and
an excitation circuit disposed in the first casing, and comprising an electromagnetic wave emitting portion configured to emit an electromagnetic wave towards the slot.
2. The portable electronic device according to claim 1, wherein the hinge serves as an electrically conductive connector between the first metal layer and the second metal layer, and the slot is defined by the first metal layer, the second metal layer and the hinge.
3. The portable electronic device according to claim 1, wherein a gap between the first casing and the second casing serves as the slot.
4. The portable electronic device according to claim 2, further comprising another hinge connecting the first casing and the second casing, wherein said another hinge serves as another electrically conductive connector between the first metal layer and the second metal layer, and the slot is located between said two hinges.
5. The portable electronic device according to claim 1, wherein the first casing comprises a front-facing surface, an outer surface and a edge surface, wherein the front-facing surface is opposite to the outer surface, the edge surface connects the front-facing surface and the outer surface, the first metal layer is disposed on the outer surface of the first casing, and the electromagnetic wave emitting portion of the excitation circuit emits the electromagnetic wave from the edge surface towards the slot.
6. The portable electronic device according to claim 5, wherein the electromagnetic wave emitting portion of the excitation circuit further emits the electromagnetic wave outwards from the front-facing surface.
7. The portable electronic device according to claim 5, wherein the first metal layer is further disposed on the edge surface of the first casing, and the first metal layer has an opening in the edge surface to expose the electromagnetic wave emitting portion of the excitation circuit.
8. The portable electronic device according to claim 7, wherein the first metal layer is further disposed on the front-facing surface of the first casing.
9. The portable electronic device according to claim 5, wherein the excitation circuit further comprises a second electromagnetic wave emitting portion configured to emit another electromagnetic wave outwards from the front-facing surface.
10. The portable electronic device according to claim 8, wherein the electromagnetic wave emitting portion of the excitation circuit further emits the electromagnetic wave outwards from the front-facing surface, and the opening of the first metal layer further extends to the front-facing surface.

11. The portable electronic device according to claim 8, wherein the electromagnetic wave emitting portion of the excitation circuit further emits the electromagnetic wave outwards from the front-facing surface, and the first metal layer further has another opening in the front-facing surface.

12. The portable electronic device according to claim 1, wherein a width of the slot is between 1 millimeter and 5 millimeters.

13. The portable electronic device according to claim 1, wherein the excitation circuit emits the electromagnetic wave through the electromagnetic wave emitting portion to the slot to excite the slot to generate a second electromagnetic wave.

14. The portable electronic device according to claim 13, wherein the second electromagnetic wave which is generated by the slot excited by the excitation circuit has a frequency between 2.4 GHz and 2.5 GHz.

15. The portable electronic device according to claim 1, wherein the excitation circuit is configured to generate the electromagnetic wave having a frequency of 5 GHz.

* * * * *